United States Patent [19]

Lang et al.

[11] Patent Number: 5,012,329
[45] Date of Patent: Apr. 30, 1991

[54] METHOD OF ENCODED VIDEO DECODING

[75] Inventors: Stuart E. Lang, Montville, N.J.; Jon Fairhurst, Grass Valley, Calif.

[73] Assignees: Dubner Computer Systems, Inc., Paramus, N.J.; The Grass Valley Group, Inc., Nevada City, Calif.

[21] Appl. No.: 300,453

[22] Filed: Feb. 21, 1989

[51] Int. Cl.$^5$ .............................................. H04N 9/64
[52] U.S. Cl. .................................................. 358/31
[58] Field of Search ........................................ 358/31

[56] References Cited

U.S. PATENT DOCUMENTS

| | | | |
|---|---|---|---|
| 3,778,543 | 12/1973 | Lowry | 178/5.4 R |
| 4,267,020 | 9/1979 | Holmes | 358/36 |
| 4,352,122 | 9/1982 | Reitmeier et al. | 358/11 |
| 4,651,196 | 3/1987 | Harwood et al. | 358/38 |
| 4,656,502 | 7/1987 | Hausdorfer | 358/31 |
| 4,661,842 | 4/1987 | Ishige et al. | 358/36 |
| 4,686,561 | 8/1987 | Harwood et al. | 358/31 |
| 4,731,660 | 3/1988 | Faroudja et al. | 358/31 |
| 4,775,888 | 10/1988 | Nakagawa et al. | 358/105 |
| 4,819,061 | 4/1989 | Lang | 358/31 |
| 4,819,062 | 4/1989 | Dongil et al. | 358/31 |
| 4,849,808 | 7/1989 | Rossi | 358/31 |
| 4,864,388 | 9/1989 | Skrydstrup | 358/22 |
| 4,916,526 | 4/1990 | Faroudia et al. | 358/31 |

FOREIGN PATENT DOCUMENTS

| | | |
|---|---|---|
| 55-105748 | 7/1980 | Japan . |
| 57-10048 | 1/1982 | Japan . |
| 58-35390 | 3/1983 | Japan . |
| 58-115478 | 6/1983 | Japan . |
| 58-169580 | 9/1983 | Japan . |
| 58-175882 | 9/1983 | Japan . |
| 58-248351 | 12/1983 | Japan . |

OTHER PUBLICATIONS

"Improvements to NTSC by Multidimensional Filtering" by Eric Dubois and William F. Schreiber, SMPTE Journal, Jun. 1988.
"Separation of NTSC Signals by Minimum Mean Square Error Filters and Adaptive Filters" by Maxemchuk & Sharma; 1978 IEEE.

Primary Examiner—Howard W. Britton
Assistant Examiner—Wendy R. Greening
Attorney, Agent, or Firm—Francis I. Gray; John Smith-Hill

[57] ABSTRACT

A digital decoder for an encoded video signal has three stages. The first stage applies a multi-dimensional digital chrominance bandpass filter to the digitized encoded video signal to produce a chrominance signal, subtracting the chrominance signal from the digitized encoded video signal to produce a luminance signal. The second stage detects edges and peaks in the chrominance signal, and corrects the luminance signal where such edges and peaks are detected to produce a chrominance corrected luminance signal without dot crawl errors. An intermediate corrected chrominance signal may also be derived from the second stage. The third stage filters the chrominance signal, or intermediate corrected chrominance signal, to reduce peaks in the chrominance signal as well as to enhance edges to produce a corrected chrominance signal with minimized cross color errors.

58 Claims, 7 Drawing Sheets

METHOD OF ENCODED VIDEO DECODING

BACKGROUND OF THE INVENTION

The present invention relates to signal processing, and more particularly to a method of encoded video decoding to improve the appearance of television pictures by eliminating cross color and dot crawl effects.

The image portion of an encoded video signal has a chrominance signal added to a luminance signal, the luminance signal describing the brightness of the picture for every point, or pixel, on a television screen and the chrominance signal describing the hue and saturation of the corresponding colors. In the NTSC system the chrominance signal is the combination of two signals that are referred to as the "I" and "Q" signals. These signals are derived from the Red, Green and Blue signals produced by television cameras and other video sources and represent color in a rectangular coordinate system. The values of I and Q individually may be either positive or negative, describing points in any of the four quadrants of the color coordinate system. The I and Q signals are used to modulate quadrature components of a subcarrier signal that are added together to form a composite chrominance signal. By sampling the composite chrominance signal at the peaks and zeros of the subcarrier signal the amplitudes and polarities of the I and Q signals may be recovered. This straight forward approach for decoding the color components is complicated by the luminance signal.

The final encoded video signal is the combination of the composite chrominance signal with the luminance signal. Therefore when sampling the encoded video signal the samples become combinations of both luminance and I or Q. The problem is the separation of the luminance and the chrominance. The modulated chrominance signal occupies the upper portion of the luminance passband, and cross color and cross luminance (dot crawl) errors occur due to errors in the separation process. For example a pattern of black and white diagonal stripes at the frequency of the subcarrier signal is essentially a chrominance signal so that luminance patterns approximating that condition produce cross color errors. When the encoded video signal is separated, energy is lost by the luminance signal and gained by the chrominance signal, resulting in loss of luminance detail as well as a disturbing rainbow pattern. Dot crawl occurs when edges between brightly colored objects produce energy outside the decoders chrominance passband so that, when the decoder separates the encoded video signal, energy is lost from the chrominance signal and gained by the luminance signal, resulting in a change in color as well as dot crawl. The greater problem in either case is not the loss, but the gain in energy, i.e., the lack of sharpness within a striped pattern is far less obvious than the moving rainbow that obviously does not belong there, and a slight color change at an edge is far less noticeable than even a small magnitude of dot crawl.

Therefore what is desired is a decoding scheme that reduces cross color and dot crawl errors while preserving detail and edge sharpness to the greatest extent possible, with no loss of detail in areas of the television picture that are free from cross color and dot crawl errors.

SUMMARY OF THE INVENTION

Accordingly the present invention provides a method of encoded video decoding that minimizes cross color and dot crawl errors in the decoding process with minimum loss of detail and edge sharpness. The decoding method uses three stages—luminance and chrominance separation, luminance processing, and chrominance processing. The separation process uses a nonadaptive multi-dimensional filter within a single video field having weighting factors that produce a peak at the horizontal center line to generate a luminance signal and a chrominance signal. The luminance processing uses an adaptive multi-dimensional process to obtain first differences in each dimension about a center pixel for the chrominance signal, then second differences in each dimension about the center pixel for the luminance signal associated with the chrominance component of the center pixel. When a chrominance edge or peak is detected from the chrominance differences, correction values are generated for the luminance signal, which values are limited by the magnitude in the change in chrominance, so that the luminance signal is filtered in the direction of minimum chrominance change. The chrominance processing further reduces cross color errors and enhances edges by reducing chrominance risetime. Again processing is in the form of an adaptive multi-dimensional chrominance filter.

The objects, advantages and other novel features of the present invention are apparent from the following description when read in conjunction with the appended claims and attached drawing.

DESCRIPTION OF THE PREFERRED EMBODIMENT

Figure 1:
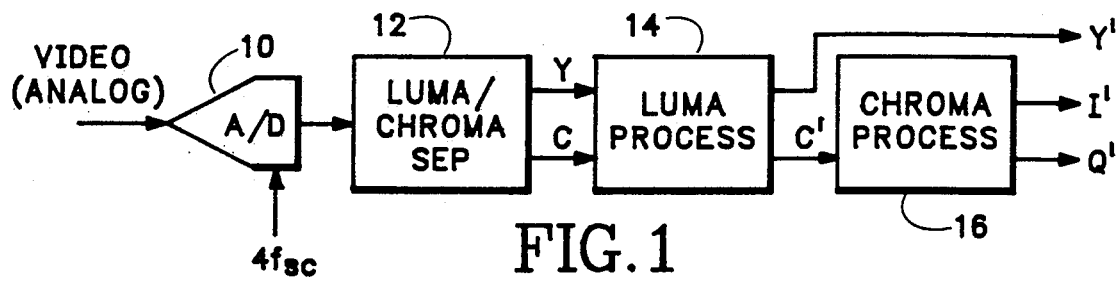
FIG. 1 is a block diagram of an encoded video decoder according to the present invention.

Referring now to FIG. 1 an encoded video signal is digitized by an analog to digital converter 10 at points corresponding to the peaks and zeros of the frequency of the subcarrier signal, as is well known in the art. The encoded video signal may already be digitized where the video source is a digital video tape recorder, for example, in which case the digitizing stage is bypassed. In either case the resulting string of digital data words having Y+Q, Y−I, Y−Q, Y+I values is input to a separation stage 12 to produce a luminance signal Y and a chrominance signal C. In areas of the television picture represented by the encoded video signal that are free from cross color and dot crawl errors, the Y and C values provide an accurate decoding of the encoded video signal. The Y and C values are input to a luminance processing stage 14 to modify the Y and C values to minimize dot crawl and some cross color errors, producing modified luminance Y' and chrominance C' signals. The modified chrominance C' signal is input to a chrominance processing stage 16 to enhance chrominance edges as well as further reduce cross color errors, outputting a final chrominance value C" that is subsequently demultiplexed into I' and Q' components, combined with the corrected luminance Y', and converted into RGB analog values, as is well known in the art, for display on a television display receiver or monitor.

Figure 2:
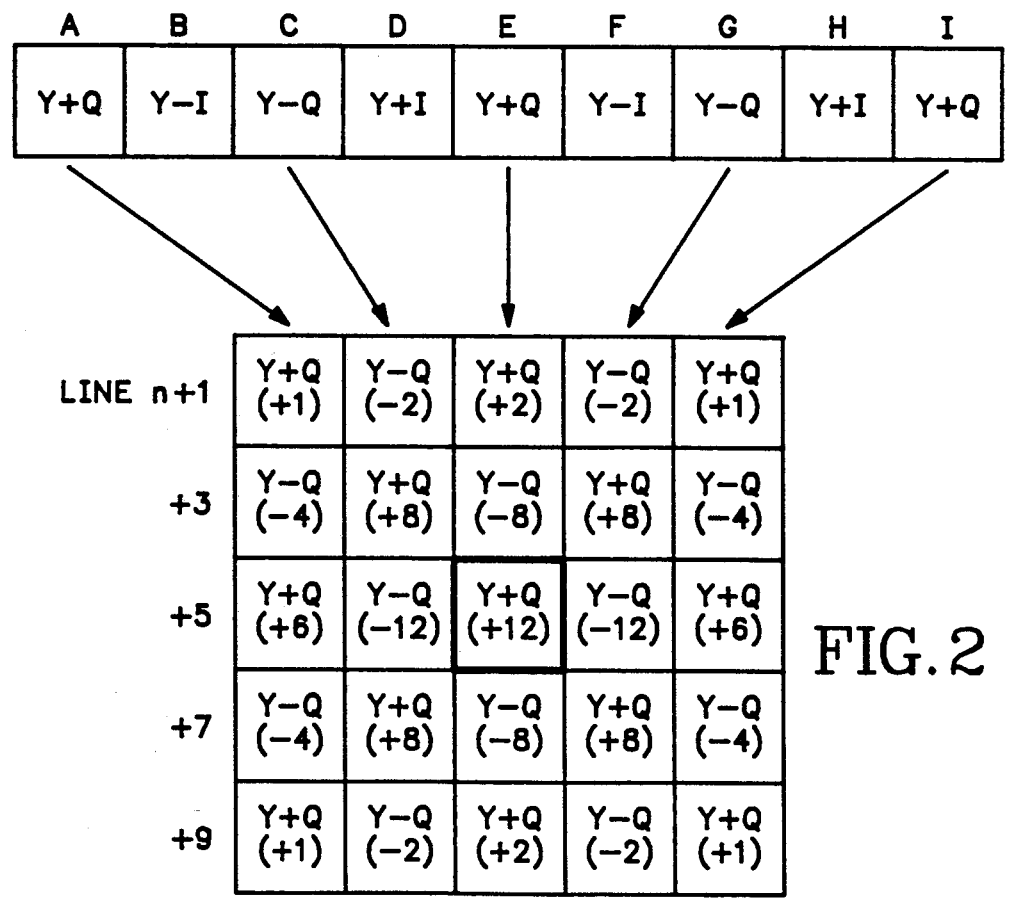
FIG. 2 is a diagram of a two-dimensional chrominance bandpass filter according to the present invention.

The following description is related to the decoding of one pixel within the television picture, but applies equally to all the pixels. For the purposes of illustration of the present decoding scheme a Y+Q pixel somewhere within the picture at a given instant of time is selected. As is shown in FIG. 2 a series of Y+Q, Y−Q, Y−I, Y+I values occur sequentially across a horizontal video line. Since the phase of the subcarrier signal reverses every line, the selected Y+Q pixel has Y−Q pixels on each side up, down, left and right in the two-dimensional case. Using pixels only within the same field from preceding and subsequent lines and only having the same chrominance component values, such as Q values, a five by five two-dimensional filter is applied to the selected pixel. Each pixel within the filter has a weighting factor associated with it, each weighting factor having a magnitude and a polarity. The polarities are arranged so that all the Q components end up with the same polarity as the Q component of the selected pixel at the center with the greatest emphasis given to the pixels closest to the center, and so that there are an equal number of −Y and +Y values. Multiplying each pixel by its corresponding weighting factor and adding all the values, the Y values cancel out leaving a value 128 times Q for the weighting factors indicated. Dividing this value by 128 results in the value for Q. The value for Q is subtracted from the value Y+Q for the selected pixel, providing the value for Y. In like manner for both I and Q components each pixel of the picture is decoded to provide the separated Y and C signals.

Figure 3:
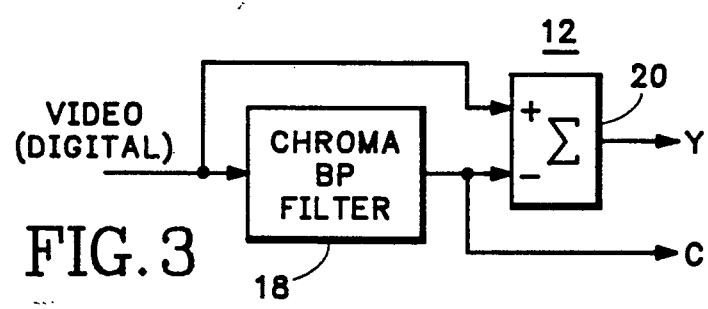
FIG. 3 is a block diagram of a luminance/chrominance separation stage according to the present invention.

The filter of FIG. 2 is essentially a two-dimensional chrominance bandpass filter with the outermost columns describing the vertical characteristics of the filter and the outermost rows describing the horizontal characteristics of the filter. The inner weights are the products of the outer weights. The advantage of this filter is that the encoded video signal must pass both vertically and horizontally at the same time so that luminance patterns of perfectly vertical or horizontal stripes at the subcarrier frequency do not pass. Only a pattern that is both perfectly diagonal and at the subcarrier frequency is passed without attenuation. The horizontal component of the filter for this embodiment takes into account the NTSC specified horizontal filtering of chrominance in the encoding process. The weighting factors chosen also enable multiplication and division to be performed by shifting and adding, e.g., division by 128 is simply a matter of dropping the seven least significant bits of the result and rounding the integer with an addition. FIG. 3 generally illustrates the chrominance bandpass filter 18 separating the chrominance signal C from the digitized encoded video signal. A subtracting circuit 20 subtracts the chrominance signal C from the digitized encoded video signal to produce the luminance signal Y.

Referring again to FIG. 1, in the luminance processing stage 14 the Q components are processed separately from the I components, while the Y signal is processed as two separate signals, one associated with each chrominance component. The separate Y signal processing is based upon the premise that activity in the Q component only introduces errors into Q-related Y samples, and activity in the I component only introduces errors into I-related Y samples. In this stage as little is done as possible since most of the picture already has been almost perfectly separated by the separation stage 12.

Figure 4:
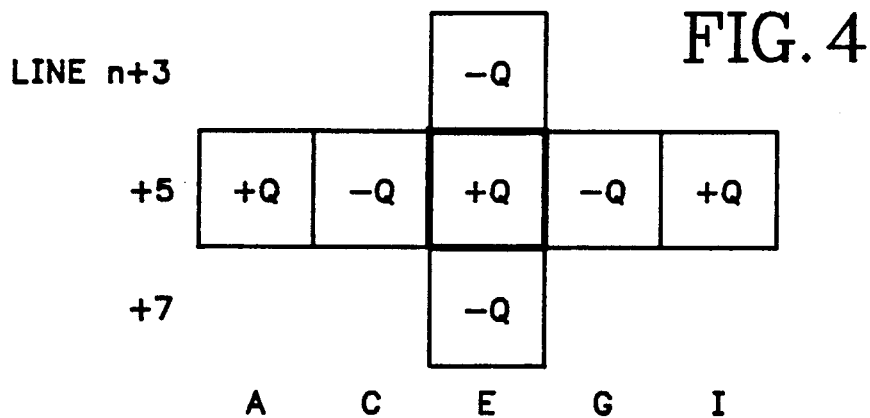
FIG. 4 is a diagram of a two-dimensional chrominance filter according to the present invention.

Referring to FIG. 4 the chrominance signal is examined, processing the same selected Q pixel. From this matrix several chrominance difference values are obtained. The first value formed is the upper pixel difference UPD=|E5+E3| which is a measure of the absolute chrominance difference in value between the center pixel and the upper pixel within the same field. Similarly a down pixel difference DND=|E5+E7| is obtained indicating the absolute chrominance difference value between the center pixel and the pixel immediately below. Another value obtained is the vertical mean difference VDM=|E5+(E3+E7)/2| which is the absolute value of the chrominance value difference between the center pixel and the average of the pixels above and below. Finally a vertical difference VD=|E3−E7| is obtained as the absolute difference between the upper and lower pixels. A subtraction is required for VD since both pixels are on the same subcarrier phase whereas for the other differences addition is used since the pixels are on opposite subcarrier phases.

Likewise horizontal chrominance difference values are obtained using the nearest chrominance values for the values of Q on the same subcarrier phase. The greater distance between pixels in the horizontal direction is necessary to compensate for the horizontal component of the two-dimensional chrominance filter. The corresponding horizontal difference values are the left difference LTD=|E5−A5|, the right difference RTD=|E5−I5|, the horizontal mean difference HDM=|E5−(A5+I5)/2|, and the horizontal difference HD=|A5−I5|.

Figure 5:
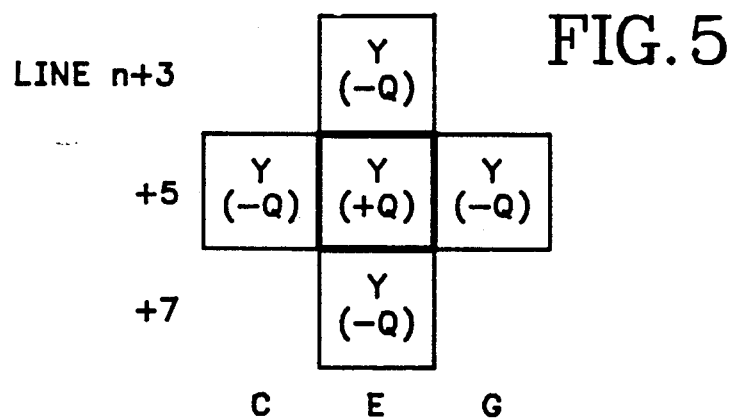
FIG. 5 is a diagram of a two-dimensional luminance filter according to the present invention.

Additional values are obtained from the luminance values corresponding to the same Q component as shown in FIG. 5, however the horizontal and vertical samples are all equidistant from the center pixel. Remembering that dot crawl is a chrominance signal within the luminance signal, if dot crawl is present along a vertical edge and the originally encoded luminance signal was the same for the three pixels, then up and down Y chrominance values UPYC, DNYC each have a magnitude equal to that of the remaining chrominance signal. UPYC=(E3−E5)/2 and DNYC=(E7−E5)/2 so that the luminance values cancel out leaving only the residual chrominance. The polarities of UPYC and DNYC cause cancellation of the chrominance signal when either, or an average of the two, is added back into the luminance channel. Similarly the left and right Y chrominance values LTYC, RTYC provide values for cancelling dot crawl along horizontal edges where LTYC=(C5−E5)/2 and RTYC=(G5−E5)/2. The UPYC and DNYC values are combined into a vertical Y chrominance correction value VYC, and the LTYC and RTYC values are combined into a horizontal Y chrominance correction value HYC.

Since UPD and DND indicate the absolute values of the chrominance differences up and down from the center pixel, if one difference is greater than the other, an edge may be present. Therefore DND is subtracted from UPD and, if the result is negative indicating an edge below the current pixel, VYC is made equal to UPYC, and, if the result is positive indicating an edge above the current pixel, VYC is made equal to DNYC. This avoids filtering across an edge. Likewise RTD is subtracted from LTD to determined if there is a horizontal edge, setting HYC to either LTYC or RTYC according to the sign, plus or minus, of the difference. The determination of edges using the difference in magnitudes allows such edge detection without the use of thresholds. Of course when the difference is small, the up/down or left/right edge determination may easily be decided by noise such that from frame to frame of the video the decision may go in opposite directions. To address this situation an area around zero difference is treated as a transitional area. In this area a proportional mix between the UPYC/DNYC or LTYC/RTYC values is performed, such as is illustrated in Table I below:

is to apply corrections only where needed, and only to the extent needed, the previously described values VDM, VD, HDM and HD are used. For nearly all of the area of a picture these signals are at or near zero since these signals indicate chrominance differences. The VD and HD values become most active in the presence of chrominance edges, while the VDM and HDM values respond to peaks in the chrominance signal. Combinations of these signals are used to clip the VYC and HYC values so that, except at edges and peaks, these values are clipped to zero or near zero. Thus the Y signal is corrected only where there are chrominance edges or peaks, and the magnitude of the correction is limited by the magnitude of the change in chrominance.

The two clip levels, VDL and HDL, are derived from VDM, VD and HDM, HD, respectively. The goal is to have clip levels just large enough to allow removal of dot crawl. A four step optimization process is followed.

At the first step:

If (HDM−0.5HD)>0; then
    HDM=4(HDM−0.5HD)+HD         (PEAK)

If (HDM−0.5HD)<=0; then HDM=2HDM    (EDGE)

At an edge HDM is small relative to HD. Since HDM is of lesser importance at an edge, its weight is smaller than when there is a peak. Where there are peaks HDM is large relative to HD. In order to allow removal of dot crawl at peaks, HDM is weighted more heavily. In the PEAK formula HDM is reduced by ½ HD. In the case of peaks HD is usually at or near zero, so it has little or no effect. However in some cases a peak may be indicated and HD may be relatively large, causing an appropriate reduction in the value before the heavier weight is applied because the peak diminishes in importance as an edge becomes more apparent. Finally the peak formula shows the addition of HD to the weighted value to smooth the transition between the EDGE

TABLE I

|  | Fractions: | | | |
| --- | --- | --- | --- | --- |
|  | 1/16 | 2/16 | 4/16 | 8/16 |
|  | U1 = UPYC/16 | U2 = UPYC/8 | U4 = UPYC/4 | U8 = UPYC/2 |
|  | D1 = DNYC/16 | D2 = DNYC/8 | D4 = DNYC/4 | D8 = DNYC/2 |

| UPD−DND | 2VYC | | | | FRACTION |
| --- | --- | --- | --- | --- | --- |
| ≤ −16 | UPYC + UPYC | | +0 | | 0/16 |
| −15 | UPYC + U8 + U4 + U2 + U1 | + | | + D1 | 1/16 |
| −14 | UPYC + U8 + U4 + U2 | + | | + D2 | 2/16 |
| −13 | UPYC + U8 + U4 | + U1 + | | + D2 + D1 | 3/16 |
| : : | : | : | : | : | : |
| −1 | UPYC | + U1 + | + D8 + D4 + D2 + D1 | | 15/16 |
| 0 | UPYC | | + DNYC | | 16/16 |
| +1 | + U8 + U4 + U2 + U1 | + DNYC | | + D1 | 15/16 |
| : : | : | | : | | : |
| +15 | | + U1 | + DNYC + D8 + D4 + D2 + D1 | | 1/16 |
| ≥ +16 | 0 | | + DNYC + DNYC | | 0/16 | where the four least significant bits of the difference are defined as the transition area. This method of mixing works without the use of multipliers since only shifts, additions and subtractions are performed. Other equivalent forms of the above mixing method may be used in order to achieve greater efficiency and/or economy. Also the above method may be expanded or contracted for greater or lesser resolution.

Simply adding VYC or HYC to Y at their related edges does eliminate dot crawl, but also destroys a considerable amount of detail in the picture. Since the key weight of two and the PEAK weight of four. VDM is processed in a similar fashion as shown below:

If (VDM−0.5VD)>0; then
    VDM=5(VDM−0.5VD)+HV         (PEAK)

If (VDM−0.5VD)<=0; then VDM=2VDM

The only difference is that the PEAK weight is five for VDM. The weight for VDM is based upon the vertical weighting of the two-dimensional chrominance bandpass filter, and the weight for HDM is based on the horizontal weighting of the filter as well as the filtering of the chrominance signals within the video encoder.

At the second step:

HDM=HDM−VDM

VDM=VDM−HDM

These new HDM, VDM values are derived from the HDM, VDM values determined in the first step. Fine diagonal detail produces cross color errors. Such errors generally appear as peaks in chrominance so that such chrominance peaks are usually due more to cross color error than any legitimate chrominance detail. True chrominance peaks produce a large value either in VDM or HDM, while false peaks due to cross color errors tend to show up in both VDM and HDM. Since cross color errors cause a loss in luminance detail and such detail produces large VYC and HYC correction values, large correction values combined with large clip values would produce additional filtering of luminance resulting in additional loss of contrast in the details. To prevent this HDM is reduced by VDM and VDM is reduced by HDM which results in a reduction of the clip values where there is fine diagonal detail. This step considerably improves the contrast of fine luminance detail, although a little more dot crawl remains in the extreme and unusual case of high contrast diagonal chrominance detail. Given a fine diagonal line it is virtually impossible to accurately separate luminance from chrominance, but, due to the chrominance filtering performed in the encoder, luminance contrast generally exceeds chrominance contrast for fine diagonal lines. Therefore it makes sense to err in the direction of calling the signal luminance.

At the third step the HD and VD values are weighted as follows:

HD=0.375HD

VD=0.500VD

HD and VD indicate the magnitude of transitions at edges. The weights are applied to reduce them to the minimum values required for dot crawl removal. The weight of ½ for VD is based on the vertical weights of the two-dimensional chrominance bandpass filter, and the weight of ⅜ for HD is based on the horizontal weights of the filter as well as the chrominance filtering in the encoding process. The weighting values chosen allow the weighting to be accomplished without multiplication.

At the final step the clip values HDL and VDL are obtained:

HDL=HDM+HD

VDL=VDM+VD

Due to the previous processing these values are usually at or near zero, becoming active only in areas of the picture where dot crawl is likely to be present.

Figure 6:
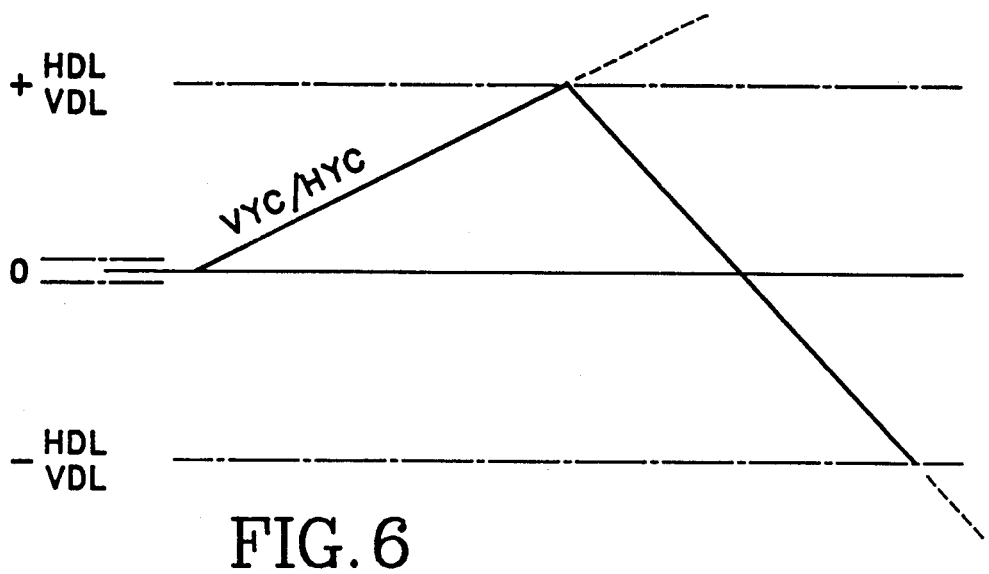
FIG. 6 is a diagram illustrating clipping of the luminance/chrominance correction value according to the present invention.

The clip values of HDL and VDL are now applied to the correction values HYC and VYC as shown in FIG. 6. Note that HDL clips VYC while VDL clips HYC because a horizontal chrominance difference means that there is a vertical edge or peak and the resulting crawl is along that vertical edge or peak, and a vertical difference indicates that there is horizontal crawl. As VYC increases in magnitude from zero it is left undisturbed until it reaches the magnitude of the clip level HDL. As VYC exceeds HDL the processed correction value is reduced in magnitude towards zero at twice the rate. If VYC is large enough, the polarity reverses and the magnitude continues to increase at twice the rate towards the clip value. The correction is not permitted to exceed the clip magnitude and holds at this value. If there is actually a chrominance transition, HDL is greater than the dot crawl and no clipping of VYC occurs. If the magnitude of VYC exceeds HDL, there is significant luminance detail that may or may not be accompanied by an actual chrominance transition. The magnitude of VYC is reduced to minimize any additional loss of luminance contrast. If VYC is more than 1.5 times the value of HDL, it is very likely that the value of HDL is due primarily to cross color error. The correction value reverses polarity, but does not exceed the clip value. The polarity reversal results in a restoration of contrast to the luminance details, and by applying the clip to the reversed polarity correction value overshoot is minimized. The reversed polarity correction value also may be used to reduce cross color error in the chrominance component. HYC is processed using VDL in the same manner. In the absence of chrominance transitions, real or cross color induced, HDL and VDL are very close to or at zero. Thus the usual result of all of this processing is a correction value at or near zero, insuring against unnecessary filtering of the luminance signal.

The final resolution is to determine from the clipped correction values HYC and VYC as well as the two chrominance difference values HDL and VDL which correction value to use. If HDL is less than VDL, then HYC is chosen, otherwise VYC is used. To avoid instability when HDL and VDL are equal or nearly equal, a transition method as described above for UPYC and DNYC may be used. In other words if HDL-VDL is negative, HYC is favored; if the result is positive, VYC is favored; and if the result is at or near zero, a mixture of HYC and VYC is favored. The resulting value is added to the luminance signal to remove dot crawl or decrease cross color error, i.e., the luminance signal is filtered in the direction of minimum chrominance change or greatest dot crawl with the magnitude of filtering being limited by the chrominance differences surrounding the selected pixel.

Correction of the chrominance signal also is considered since dot crawl is modulated chrominance in the luminance signal. The chrominance signal obtained from the bandpass filter has been filtered, resulting in a slight loss of chrominance sharpness that is virtually invisible in normal pictures. If a reverse polarity value is selected based on HDL and VDL for luminance to restore contrast to the luminance signal, adding the same correction to chrominance reduces the cross color error. For example if the clipping process causes HYC to reverse polarity and HDL is significantly less than VDL, then HYC also is applied to chrominance. If HDL and VDL are close in value, producing a mixture of HYC and VYC, then no correction is applied to the chrominance since, if HDL and VDL are both very small, there is little or no error to correct. If HDL and VDL are both large and very close in value, and HYC and/or VYC have been reversed in polarity, fine diagonal detail is indicated and it is impossible to properly separate luminance and chrominance, so applying the correction to chrominance would only increase the cross color error.

It is emphasized that these fine diagonal detail situations are extreme cases so, while it is recommended that the correction only be applied to the chrominance signal as described above, a user may wish to have the correction always applied in order to obtain maximum chrominance sharpness. The available options for applying the correction to chrominance are:
1. No chrominance correction.
2. Apply same correction to luma and chroma.
3. Correct chrominance only when cross color error.
4. Correct chrominance at edges or for cross color errors.

The last option is accomplished by first selecting the greater of the weighted HD or VD values that are large in the presence of chrominance edges while small in the presence of cross color errors or thin lines. The greater value of HD or VD is used to clip the correction value before it is applied to chrominance, simply limiting the correction without polarity reversal. The additional clipping only applies to the chrominance correction. The selection of HYC or VYC is still based on HDL and VDL. In fact it is possible for HDL to be greater than VDL at the same time that HD is less than VD, such as in the presence of narrow lines, whether or not there is a cross color error. If a cross color error is detected, then the clipping based on HD or VD is bypassed.

Figure 7:
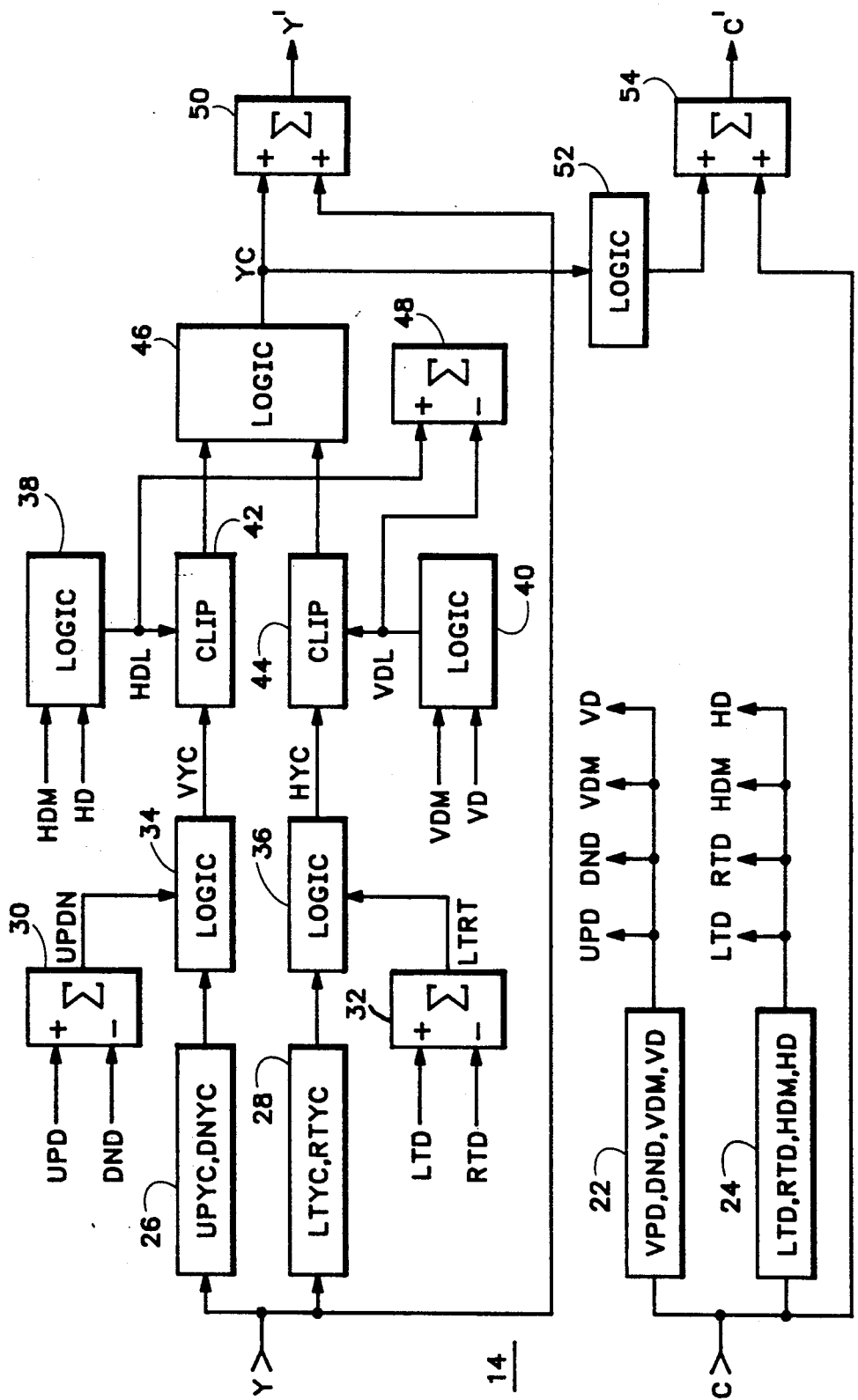
FIG. 7 is a block diagram of a luminance processing stage according to the present invention.

Referring now to FIG. 7 the chrominance signal C is input to respective vertical and horizontal arithmetic circuits 22, 24 to generate the UPD, DND, VDM, VD and LTD, RTD, HDM, HD values for use in the luminance processing. Likewise the luminance signal Y is input to respective left and right arithmetic circuits 26, 28 to generate the UPYC, DNYC and LTYC, RTYC values. The UPD, DND and LTD, RTD values are input to respective summing circuits 30, 32 to generate the appropriate control signals for input to respective combinational logic circuits 34, 36 to generate the VYC and HYC values from the UPYC, DNYC and LTYC, RTYC values as described above. The HDM, HD and VDM, VD values are input to respective logic circuits 38, 40 to generate the clip levels HDL, VDL that are applied to VYC and HYC. Clip logic circuits 42, 44 apply the HDL and VDL clip values to the VYC and HYC as described above to generate modified VYC and HYC values that are input to a logic circuit 46. The HDL, VDL values also are input to a summing circuit 48 to generate a difference signal for the logic circuit 46. The output YC of the logic circuit 46 is either HYC if the difference signal is negative, VYC if the difference signal is positive, or a mix if the difference signal is at or near zero. The correction value YC is added to the luminance signal Y in a summing circuit 50 to produce the corrected luminance signal Y,, and also is input to a chrominance combination logic circuit 52 for a determination as to whether it also is applied to the chrominance signal C as well, as also is described above. If passed by the logic circuit 52, YC is added to C in a summing circuit 54 to produce the modified chrominance signal C', otherwise C becomes C' without any modification.

Referring again to FIG. 1, the final chrominance processing stage 16 further reduces cross color errors as well as reducing chrominance risetime at edges. Cross color errors generally produce peaks in the chrominance signal vertically and horizontally. Vertical filtering brings about a significant reduction in the magnitude of these peaks, which is especially true when combined with horizontal filtering. A conflicting requirement for the vertical filtering is that it must not smear horizontal edges, i.e., it must reduce peaks in the chrominance signal without blurring edges. An up and down vertical filter, similar to that shown in FIG. 4, is applied to the chrominance signal output by the luminance processing stage 14 to obtain an up chrominance value UPC and a down chrominance value DNC. Filtering up and down in this manner avoids filtering across edges with the resulting blurring of horizontal edges while still reducing peaks. The filter selection is controlled by a value UPDN obtained by subtracting the absolute value of the chrominance difference down from the absolute value of the chrominance difference up, i.e., UPDN=UPD−DND. Again a mixture of values is used when UPDN is at or near zero. This filtering sharpens transitions at horizontal edges since, if the pixel is above the edge, filtering up produces a new value that is closer to the value above it, while if the pixel is below the edge, filtering down produces a new value that is closer to the value below it. In either case the difference between the chrominance values of the pixels on either side of the edge is increased, sharpening the edge.

Filtering occurs both up and down in the absence of edges. If the chrominance is not changing, the result is simply a reduction in chrominance noise. If chrominance is ramping nearly linearly from one value to another, the shape of the ramp becomes more linear with a reduction in noise. If the ramp is nonlinear, edge detection occurs resulting in a slight reduction in risetime. If cross color errors cause false edge detection, chrominance filtering still occurs up or down, reducing the magnitude of the error.

The effect of following the vertical processing with horizontal processing is the creation of a two-dimensional chrominance filter. For any given pixel the filter may be two or three pixels high by two or three pixels wide, resulting in a value obtained by averaging from four to nine chrominance pixels. This significantly reduces cross color errors in the chrominance signal. The horizontal chrominance processing also sharpens transitions using two modes of operation. In the first mode processing is similar to that of the vertical processing with similar results. In the second mode the sharpening process is enhanced to the point of significantly reversing the blurring of edges due to the bandwidth reduction of I and Q within the encoder.

Figure 8A:
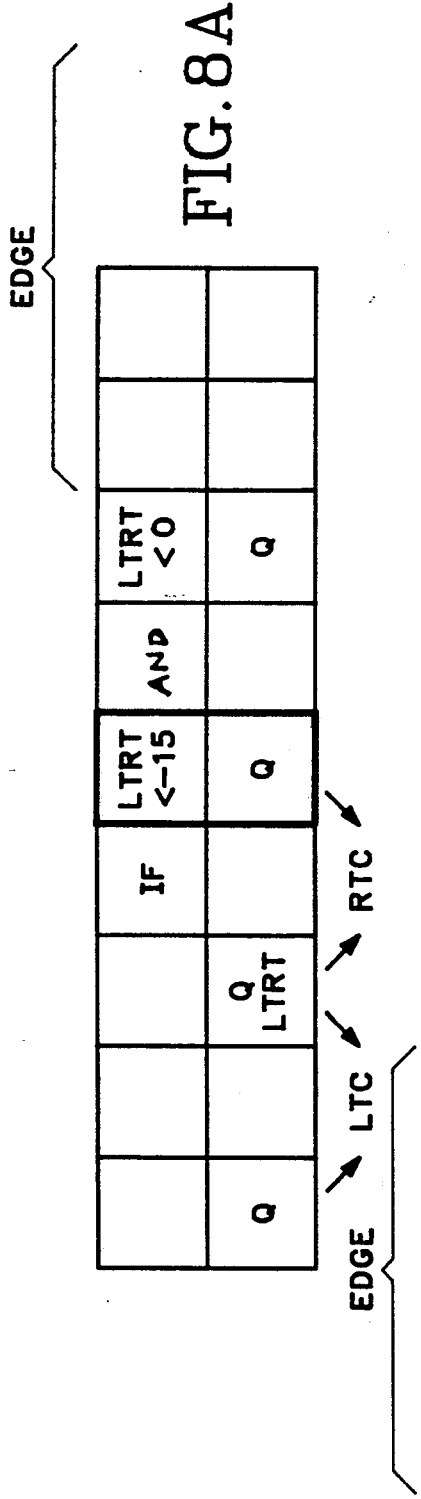
FIGS. 8A–8C illustrate edge enhancement in a chrominance processing stage according to the present invention.
Figure 8B:
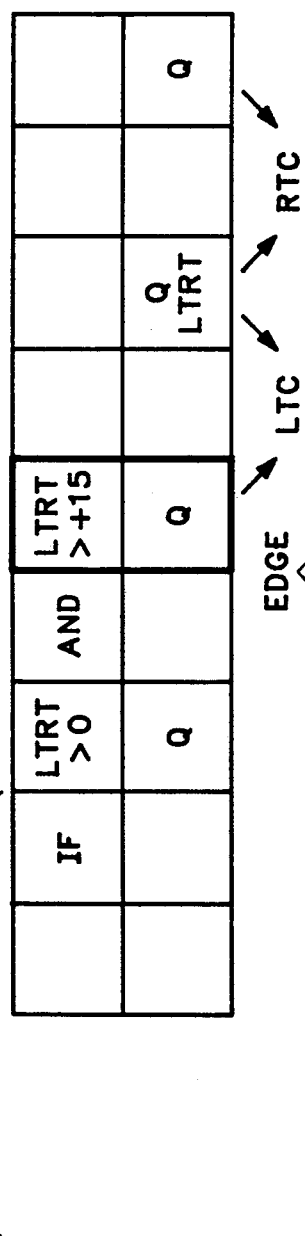
Figure 8C:
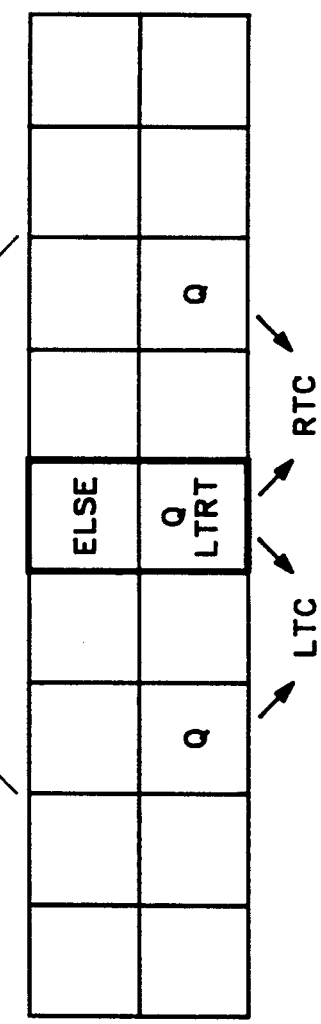

Referring now to FIGS. 8a-8c if the selected pixel is located on the left side of an edge, values one pixel to the left of the selected pixel are processed. If the selected pixel is on the right side of an edge, processing is shifted to the right. If no edge is detected, or if the selected pixel is on or adjacent an edge, no shifting occurs. LTRT is a value obtained by subtracting the absolute value of the chrominance difference right RTD from the absolute value of the chrominance difference left LTD, i.e., LTRT=LTD−RTD. A decision is made based on the value of LTRT for the selected Q pixel and the value of LTRT for the Q pixel to the right. If LTRT for the current pixel is less than −15, the pixel is located on the left side of an edge. If the LTRT value for the Q pixel to the right is negative, then it too is on the left side of an edge. The process is then shifted one Q pixel to the left. The LTRT value for the Q pixel to the left is selected. LTC and RTC values are formed by averaging the indicated pixels, and further processing is performed using these values. If the LTRT value for the Q pixel to the right is not less than zero, then that pixel may be on the opposite (right) side of the edge. In that case the selected pixel is adjacent the edge, so shifting is inhibited. The complementary process (FIG. 8b) occurs for shifting to the right. If conditions for shifting right or left do not exist, then the LTRT, LTC and RTC values are obtained unshifted (FIG. 8c). Once the LTRT, LTC and RTC values are obtained, the processing is identical to the vertical chrominance processing.

Shifting only occurs if the LTRT value of the selected pixel is less that −15 or greater than +15, corresponding to a transitional area such as previously described. Checking the polarity of the next pixel to the right or left allows shifting to be inhibited if the selected pixel is adjacent the center of the transition. The restrictions on shifting serve to stabilize the center point of the sharpened transition. The center portion of the transition is still appreciably sharpened without shifting. The edge detection process may falsely detect an edge and cause shifting in the presence of a nonlinear ramp of chrominance. This merely steepens the ramp, reversing the action of the encoders filtering. In applications that do not require edge sharpening, the horizontal processing functions in the same manner as the vertical processing by disabling the shifting process.

Figure 9:
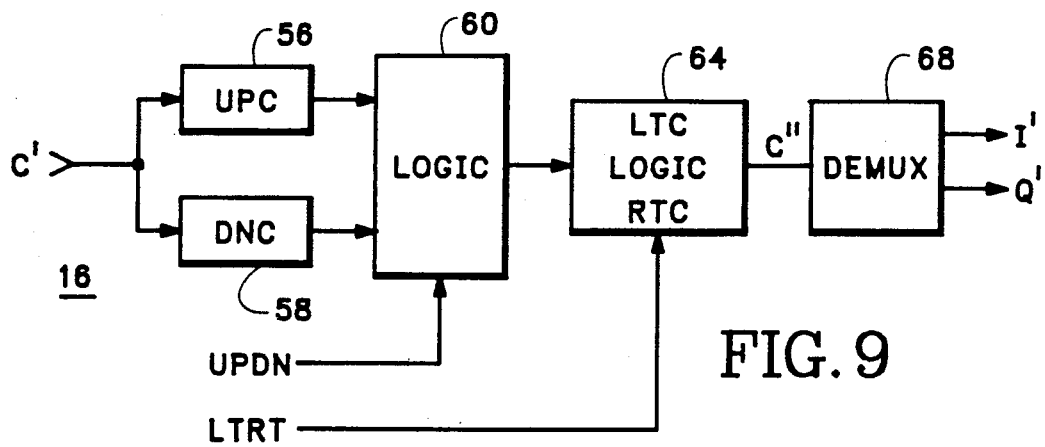
FIG. 9 is a block diagram of a chrominance processing stage according to the present invention.

An implementation of the chrominance processing is shown in FIG. 9 where the chrominance signal from the luminance processing stage 14 is input to respective vertical filters 56, 58 to generate the UPC, DNC values. These values are input to a logic circuit 60. UPDN is applied to the logic circuit 60 to determine which value, UPC, DNC or a mixture, is passed on for further processing by a horizontal filter 64. The horizontal filter 64 contains two stages of processing as discussed above, with the second stage being the selection of either LTC, RTC or a mixture as determined by LTRT. The output of the horizontal filter 64 is the final corrected chrominance signal C″ that is subsequently demultiplexed by a demultiplexer 68 to separate the I and Q components, as is well known in the art.

In some applications it may be necessary to reduce the number of line delays required by the decoding process. The total decoder delay is four lines. This delay should not be confused with the total number of line delays necessary for implementation. The two-dimensional chrominance bandpass filter requires pixels from five lines, using a total of four line delays. The actual delay is two lines since it only takes two line delays to reach the vertical center of the filter. The luminance and chrominance processing stages each add one line delay, bring the total to four. Delays may be removed from the chrominance bandpass filter. One delay may be removed by reducing the height of the filter from five pixels to three. The vertical component would then be changed from +1, −4, +6, −4, +1 to −1, +2, −1. The resulting filter is somewhat comparable to what is commonly referred to as a "2H comb" or "double comb" filter. A corresponding change is made in the processing for VDM in the luminance processing section of the decoder. In the first step of the clip optimization process VDM is always set equal to 2VDM−VD. The major result of this change is an increased vulnerability to cross color errors.

The chrominance bandpass filter may even be reduced to zero delay. Only the current line and the previous line, the line above, are used. The vertical component becomes −1, +1. In this case VDM is not altered in the first step of the clip optimization process. The drawback is significantly more and greater cross color errors. With the chrominance bandpass filter reduced to zero delay the vertical delay of the luminance processing stage may also be eliminated, further degrading the process. At this point the process is unable to remove all dot crawl caused by thin horizontal lines, although horizontal edges are still free of crawl. In this case VDM is set equal to UPD since there is no other way to create VDM, and VD is set to zero. VYC is set equal to UPYC and clipped as before. Eliminating the vertical chrominance filtering eliminates the last line delay. Even with all the line delays removed, the decoder still performs better than many typical decoders. The chrominance edge sharpening process still functions since horizontal processing is not affected.

Other combinations are possible for varying numbers of line delays. The bandpass filter may be set for 2, 1 or 0 delay; the luminance processing section may have 1 or 0 delay, although zero only makes sense if the chrominance bandpass filter is set also to zero delay; and the chrominance processing stage may be set to 1 or 0 delay. The chrominance processing stage is probably the best place to eliminate one line of delay. Another line of delay may be eliminated in the bandpass filter, leaving a very good decoder with just two lines of delay.

The methods described above may be expanded to produce a three-dimensional decoder. The first two dimensions are horizontal and vertical as before. The third dimension is temporal, or frame to frame. Prior frame comb filters were adaptive, disabling the frame combing if motion is detected between frames. Considering normal picture content, an awful lot of any given frame is likely to be be in motion, and when a camera pans a scene the frame combing must be entirely disabled. The present three-dimensional decoder is based upon the two-dimensional decoder described above. As in the two dimensional process there are the three basic stages of chrominance bandpass filtering and luminance/chrominance separation, luminance processing, and chrominance processing as shown in FIG. 1.

Figure 10:
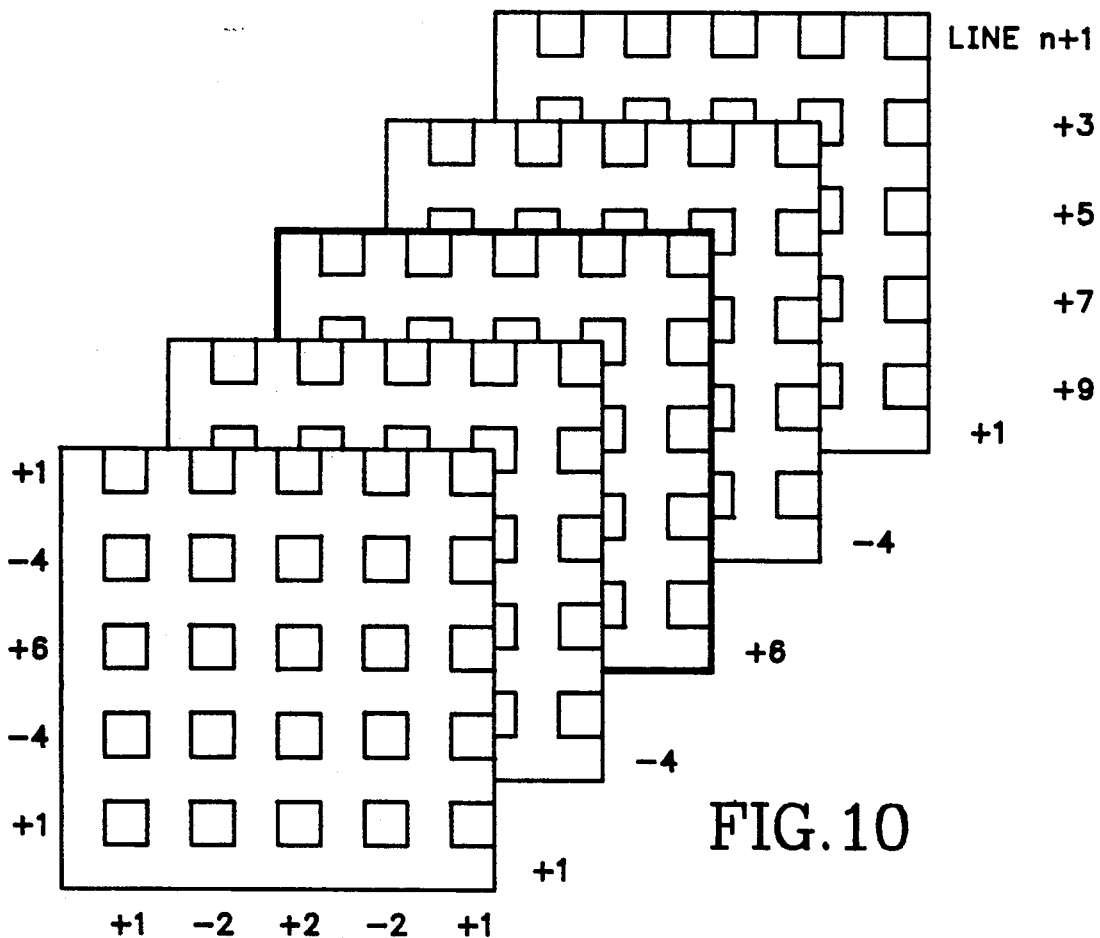
FIG. 10 is a diagram of a three-dimensional chrominance bandpass filter for a luminance/chrominance separation stage of a decoder according to the present invention.

In the three-dimensional decoder the first stage is changed as shown in FIG. 10 by adding the third dimension to the chrominance bandpass filter, with the temporal weights being identical to the vertical weights where the filter is five frames deep. The value obtained from this filter is 2048 times chrominance with the weight of the selected pixel being 72 ($2 \times 6 \times 6$). A total of 125 pixels is used to derive the chrominance value. By processing each dimension sequentially the number of adders and other circuits required may be reduced to a manageable number. The best approach is to begin the process with temporal filtering. By doing the temporal filtering first, only encoded signals require frame delays. The values from the temporal filter feed the vertical filter, and the encoded signal requires a matching delay to the center line of the vertical filter. Finally the values from the vertical filter are processed by the horizontal filter, again with a matching delay to the center of the filter for the encoded signal. The result is a three-dimensional chrominance bandpass filter that is always operative regardless of picture content.

Since the filter is five pixels deep in the temporal direction, four frames of delay are required for the encoded signal. This involves a considerable amount of memory. The memory may be reduced to just two frames of delay by making the filter only three pixels deep in the temporal direction, changing the temporal weighting to $-1, +2, -1$ which is the same weighting that is used when the vertical component of the two-dimensional filter is reduced to three pixels from five. Although this reduces the frame memory requirement in half, the five frame filter is preferred because of its greater immunity to cross color error.

The greater immunity to cross color errors of the three-dimensional filter is most evident when there are fine diagonal lines in a stationary picture since the luminance values cancel from frame to frame when the picture content does not change. Even where there is movement the cross color error is significantly reduced relative to the two-dimensional filter because the greater the number of samples used immediately surrounding the selected pixel, the greater the chances are that the luminance cancels out. Once again an average chrominance value is obtained that is weighted heavily around the selected pixel. The luminance value is again obtained by subtracting the chrominance value from the selected pixel.

The luminance signal is as free of cross color error as it can be, but there may be a considerable amount of dot crawl. Just as each dimension helps to reduce cross color error, each dimension may produce dot crawl. The luminance signal contains dot crawl at vertical or horizontal chrominance edges as before, but now it also contains dot crawl at temporal chrominance edges. To gain some perspective on the amount of dot crawl error added by the temporal filtering, consider a person's face and a static background. Even though the person may be moving his head, the area of the picture that changes in chrominance from frame to frame is very small. The fairly random and low contrast luminance details in the face tend to be cancelled out by the chrominance bandpass filter. For most of the picture there really isn't very much in the way of temporal chrominance edges, so the temporal filter doesn't really produce much additional dot crawl. In fact the temporal edges are mainly at the edges of objects. The area of dot crawl widens depending on the amount of motion from frame to frame. A scene cut is comparable to a horizontal edge in terms of dot crawl produced. The difference is that the crawl only has a duration of a fraction of a second surrounding the scene cut. The viewer's brain is far more occupied with the scene cut than with any increased dot crawl that might be present for a few frames. Thus dot crawl errors caused by temporal filtering are less disturbing than those caused by vertical or horizontal filtering, but they also are corrected in the three-dimensional decoder.

Figure 11:
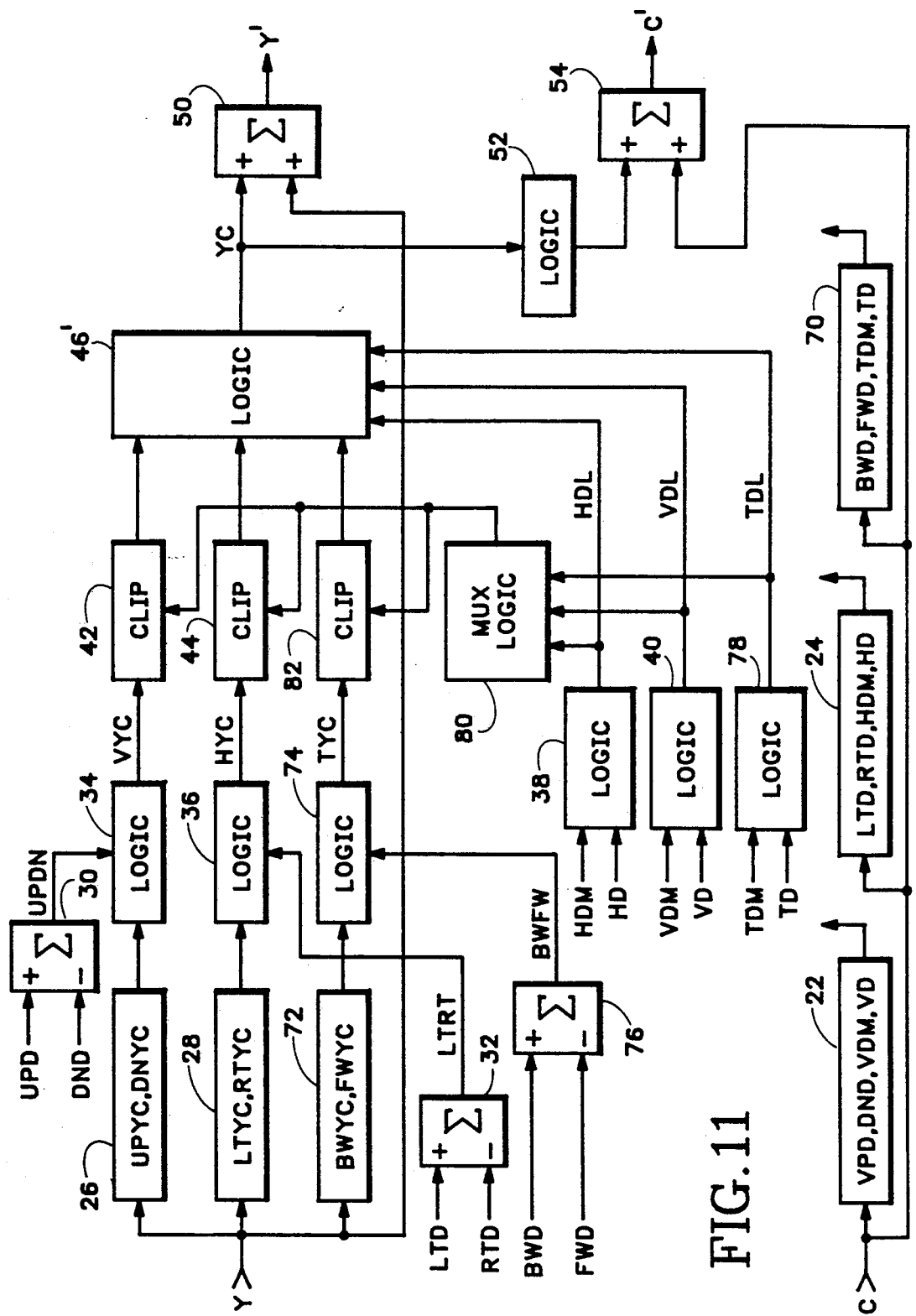
FIG. 11 is a block diagram of a three-dimensional luminance processing stage according to the present invention.
Figures 12A, 12B:
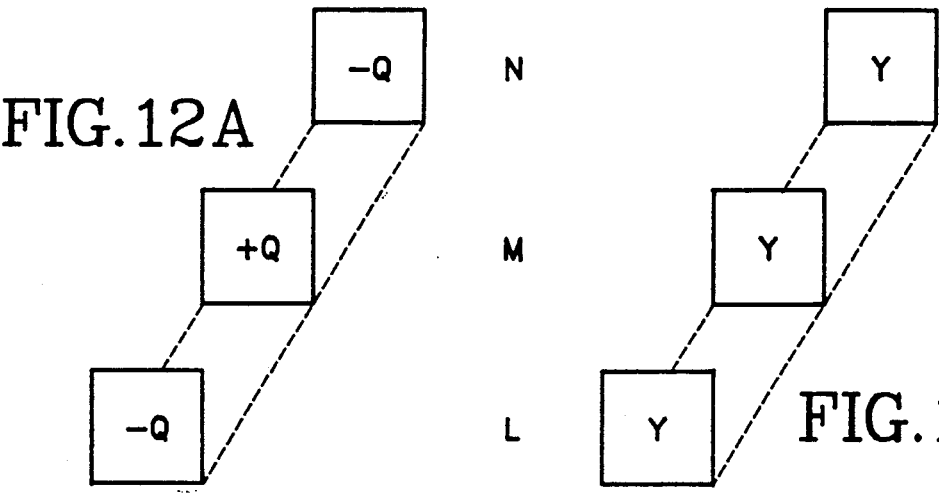
FIGS. 12A and 12B are diagrams of temporal filters for the luminance processing stage according to the present invention.

The luminance processing is virtually identical to that used in the two-dimensional decoder. Dot crawl errors are located by detecting horizontal and vertical chrominance differences as well as temporal chrominance differences. The magnitude of the luminance filter values are again limited by the chrominance differences, and filter selection also is determined by the chrominance differences. However as shown in FIG. 11 there are three filters instead of two. The absolute difference values, backward difference BWD, forward difference FWD, temporal mean difference TDM and temporal difference TD, correspond to UPD, DND, VDM and VD and are generated by a temporal arithmetic circuit 70. As shown in FIG. 12a $BWD=|M+L|$, $FWD=|M+N|$, $TDM=|M+(N+L)/2|$ and $TD=|L-N|$. Likewise the backward Y chrominance BWYC and forward Y chrominance FWYC are obtained by a temporal filter 72 that correspond to the vertical values UPYC and DNYC as illustrated in FIG. 12b, i.e., $BWYC=(L-M)/2$ and $FWYC=(N-M)/2$, and the temporal luminance correction TYC is obtained from BWYC and FWYC from a logic circuit 74 under control of a summing circuit 76, corresponding to VYC and HYC. The clip level TDL, corresponding to VDL and HDL, is obtained from TDM and TD in a temporal logic circuit 78 as follows:

For use with the five frame chrominance filter:

If (TDM−0.5TD)>0; then
TDM=5(TDM−0.5TD)+HD     (PEAK)

If (TDM−0.5TD)<=0; then TDM−2TDM     (EDGE)

For use with the three frame chrominance filter:

TDM=2TDM−TD

A zero frame delay three-dimensional chrominance bandpass filter is possible if only the current and previous frames are used, with the weight of the current frame being +1 and the weight of the previous frame being −1. TDM is unchanged. If the frame delay introduced by the luminance processing stage also is to be eliminated, TDM is set equal to BWD, TD is set equal to zero, and TYC is set equal to BWYC.

HDM and VDM are processed as before to help reduce errors on diagonal details, but no comparable processing is necessary for TDM. TD is set equal to 0.500TD, the same weighting as applied to VD, and TDL = TDM + TD, the same as the formation of VDL and HDL.

In the two-dimensional decoder VYC is clipped with HDL and HYC is clipped with VDL. When there is a chrominance edge or line, the resulting correction value is from the luminance filter that lies in the same direction as the smaller chrominance change, the clip value applied to that filter being associated with the larger chrominance change as selected by a multiplexer clip logic circuit 80. Therefore in the three-dimensional decoder all three filter values are clipped by the largest of HDL, VDL or TDL in the same fashion as described previously, TYC being clipped in clip circuit 82. From the three clipped filter values the clipped filter value associated with the luminance filter that lies in the direction of the smallest chrominance change. However when two or three of the chrominance differences are close in value, a mixing of the values is desired. The largest chrominance difference value is discarded together with its associated clipped filter value, and the remaining two pairs of values are used to determine the final correction value in a modified multiplexer logic circuit 46'. For example if TDL is the largest chrominance difference, it is discarded along with TYC, leaving the chrominance difference values HDL and VDL with the associated filter values HYC and VYC, both of which were clipped by the discarded TDL. The correction value is determined from the remaining values as previously described.

Figure 13:
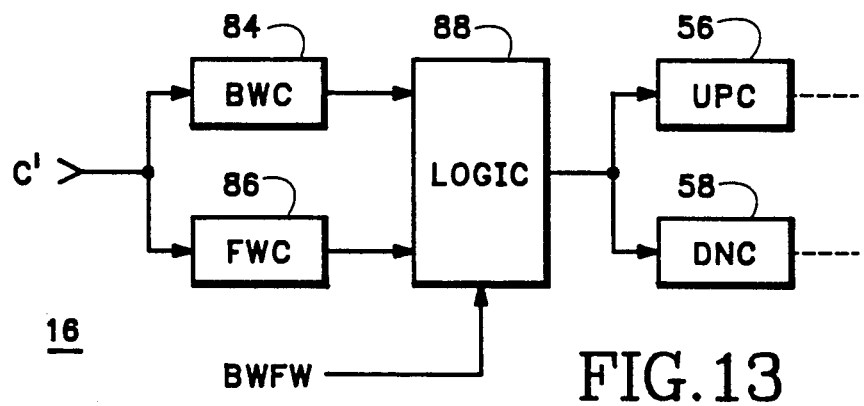
FIG. 13 is a partial block diagram of a chrominance processing stage illustrating the addition of a temporal dimension according to the present invention.

Temporal chrominance processing is performed in exactly the same fashion as vertical processing, and precedes vertical chrominance processing as shown in FIG. 13. This processing is useful for eliminating cross color errors caused by fine diagonal detail that is in motion, such as the cross color error on a football referee's shirt as the referee and/or camera move. Enhancement of temporal chrominance edges is an interesting side effect of the processing, but the improvement would not be noticed by the viewer. Thus the decision logic is eliminated. A fixed filter is used with weights of +2 for the selected chrominance pixel and −1 for each of the corresponding values from the frames before and after if the chrominance signal is still modulated. However if the chrominance signal is demodulated between the luminance and chrominance processes, then the weights for each of the corresponding values from the frames before and after is +1. The processing may be reduced to simply average the selected pixel with the corresponding pixel in the previous frame so as not to produce any additional frame delays of the signal while still providing a considerable reduction in cross color error. As shown temporal filters 84, 86 generate BWC, FWC in the same manner as for the vertical filters 56, 58, and a logic circuit 88 has BWFW as an input to provide either BWC, FWC or a mix of BWC and FWC as an output for transmission to the vertical filters. Of course temporal chrominance processing may be dispensed with since the chrominance bandpass filter significantly reduces cross color errors, and the vertical and horizontal chrominance processing further reduces such cross color errors as remain.

Although the present invention is implemented relatively easily in digital form, an analog decoder also could be implemented having the same stages to produce the same results.

Thus the present invention provides a digital method of encoded video decoding in either two or three dimensions that processes the encoded video signal with a two or three dimensional chrominance bandpass filter to separate luminance from chrominance, processes the luminance to eliminate dot crawl errors, and then processes the chrominance to reduce any remaining cross color errors and to enhance chrominance edges by decreasing chrominance risetime.

What is claimed is:

1. A decoder for an encoded video signal comprising:
   means for filtering the encoded video signal in at least two dimensions to separate the encoded video signal into a luminance signal and a chrominance signal, the chrominance signal having two components;
   means for filtering the luminance signal to produce a corrected luminance signal as a function of edges and peaks in the chrominance signal; and
   means for filtering the chrominance signal to produce a corrected chrominance signal having enhanced chrominance edges as a function of edges in the chrominance signal.

2. A decoder as recited in claim 1 wherein the luminance signal filtering means comprises:
   means for generating from the chrominance signal a first pair of difference values and a second pair of difference values in each dimension for each pixel of the encoded video signal, the first and second pairs of difference values being representative of edges and peaks in the chrominance signal;
   means for generating from the luminance signal a pair of chrominance error values in each dimension for each pixel of the encoded video signal;
   means for determining from the pair of chrominance error values and the first and second pairs of difference values a luminance correction value for each pixel of the encoded video signal; and
   means for combining the luminance correction value with the luminance signal to produce the corrected luminance signal.

3. A decoder as recited in claim 2 further comprising means for combining the luminance correction value with the chrominance signal to produce an intermediate corrected chrominance signal for input to the chrominance signal filtering means.

4. A decoder as recited in claim 2 wherein the first and second pair generating means comprises, for at least one dimension, means for calculating as the first pair of difference values for each pixel the difference value between the chrominance value of a current pixel and the chrominance value of each adjacent pixel along said one dimension, and as the second pair of difference values the difference value between the chrominance values of the two adjacent pixels along said one dimension and the difference value between the chrominance value of the current pixel and the mean of the chrominance values of the adjacent pixels along said one dimension, all of the pixels being of the same chrominance component.

5. A decoder as recited in claim 2 wherein the chrominance error values generating means comprises means for calculating for each pixel in each dimension the difference value between the luminance values of a current pixel and each adjacent pixel having the same chrominance component as the current pixel to produce the pair of chrominance error values.

6. A decoder as recited in claim 2 wherein the determining means comprises:
   means for producing in each dimension an intermediate luminance correction value from the pair of chrominance error values and the first pair of difference values;
   means for clipping the intermediate luminance correction values as a function of the second pairs of difference values to produce a limited luminance correction value in each dimension; and
   means for producing the luminance correction signal from the limited luminance correction values and the second pairs of difference values.

7. A decoder as recited in claim 6 wherein the intermediate luminance correction value producing means comprises:
   means for calculating from the first pair of difference values in each dimension a logic control signal having at least two states; and
   means for selecting one of the pair of chrominance error values when the logic control signal is in a first state and the other of the pair of chrominance error values when the logic control signal is in a second state as the intermediate luminance correction value.

8. A decoder as recited in claim 7 wherein the intermediate luminance correction value producing means further comprises means for mixing the pair of chrominance error values when the logic control signal is in a third state intermediate the first and second states, the third state having a range of values that determines the degree of mixing between the pair of chrominance error values.

9. A decoder as recited in claim 6 wherein the clipping means comprises:
   means for deriving from the second pairs of difference values a clip level in each dimension; and
   means for applying the clip level to the intermediate luminance correction value to limit the intermediate luminance correction value between zero and the clip level.

10. A decoder as recited in claim 9 wherein the luminance correction signal producing means comprises:
means for deriving from the clip levels a logic control signal having at least two states; and
means for selecting one of the limited luminance correction values when the logic control signal is in a first state and another of the limited luminance correction values when the logic control signal is in a second state as the luminance correction signal.

11. A decoder as recited in claim 9 wherein the deriving means comprises:
means for weighting one of the second pair of difference values in each dimension by an amount determined by whether the second pair of difference values represents a peak or an edge to produce a first weighted difference value;
means for combining the one difference values to produce adjusted difference values in each dimension;
means for weighting the other one of the second pair of difference values in each dimension to produce a second weighted difference value; and
means for combining the adjusted and second weighted difference values to produce the clip level in each dimension.

12. A decoder as recited in claim 6 wherein the luminance correction signal producing means comprises:
means for calculating from the second pairs of difference values a logic control signal having at least two states; and
means for selecting one of the limited luminance correction values when the logic control signal is in a first state and another of the limited luminance correction values when the logic control signal is in a second state as the luminance correction signal.

13. A decoder as recited in claim 12 wherein the calculating means comprises:
means for deriving from the second pairs of difference values a clip level in each dimension; and
means for generating from the clip levels the logic control signal.

14. A decoder as recited in claim 12 wherein the luminance correction signal producing means further comprises means for mixing the limited luminance correction values when the logic control signal is in a third state intermediate the first and second states, the third state having a range of values that determines the degree of mixing between the limited luminance correction values.

15. A decoder as recited in claim 1 wherein the chrominance signal filtering means comprises a plurality of processing stages, one for each dimension and each stage having an input signal and an output signal, the stages being connected in series such that the output signal from one stage is the input signal to the next stage and the input signal to the first stage is the chrominance signal and the output signal from the last stage is the corrected chrominance signal.

16. The decoder as recited in claim 15 wherein each stage comprises:
means for generating from the input signal a pair of chrominance correction values for each pixel of the encoded video signal; and
means for selecting one of the pair of chrominance correction values for the output signal as a function of the first pair of difference values.

17. A decoder as recited in claim 16 wherein the generating means comprises means for obtaining the difference between a current pixel and each adjacent pixel having the same chrominance component to form the pair of chrominance correction values.

18. A decoder as recited in claim 16 wherein the selecting means comprises:
means for generating from the first pair of difference values a logic control signal having at least two states;
means for providing as the output one of the chrominance correction values when the logic control signal is in one state and the other of the chrominance correction values when the logic control signal is in the other state.

19. A decoder as recited in claim 18 wherein the providing means further comprises means for providing as the output a mix of the chrominance correction values when the logic control signal is in a third state between the at least two states, the third state having a range of values that determines the mix of the chrominance correction values.

20. A decoder as recited in claim 16 wherein the last stage further comprises means for enhancing the chrominance edges of the encoded video signal as a function of the first pair of difference values for the last stage.

21. A decoder as recited in claim 20 wherein the enhancing means comprises:
means for generating a shift control signal as a function of the first pair of difference values for the current pixel and adjacent pixels having the same chrominance component, the shift control signal having at least two states;
means for determining the pixels from which the pair of chrominance correction values is generated by the chrominance correction value generating means for the current pixel; and
means for generating the pair of chrominance correction values for the current pixel from the determined pixels.

22. A decoder as recited in claim 21 wherein the determining means comprises;
means for obtaining the pair of chrominance correction values for the current pixel from the current pixel and the two pixels in one direction from the current pixel having the same chrominance component when the shift control signal is in a first state, from the current pixel and the two pixels in the opposite direction from the current pixel having the same chrominance component when the shift control signal is in a second state, and from the current pixel and adjacent pixels having the same chrominance component when the shift control signal is in a third state intermediate the first and second states.

23. A decoder as recited in claim 21 wherein the shift control signal generating means comprises:
means for calculating an edge detect signal from the first pair of difference values for both the current pixel and adjacent pixels;
means for developing the shift control signal in the first state when the edge detect signal for the current pixel has a value less than a first limit value and the edge detect signal for one adjacent pixel has the same sign, in the second state when the edge detect signal for the current pixel has a value more than a second limit value and the edge detect signal for the opposite adjacent pixel has the same sign, and in the third state when the conditions for the first and second states are not satisfied.

24. A decoder for an encoded video signal comprising:

means for filtering the encoded video signal in at least two dimensions to separate the encoded video signal into a luminance signal and a chrominance signal, the chrominance signal having two components;

means for generating from the chrominance signal a first pair of difference values and a second pair of difference values in each dimension for each pixel of the encoded video signal, the first and second pairs of difference values being representative of edges and peaks in the chrominance signal;

means for generating from the luminance signal a pair of chrominance error values in each dimension for each pixel of the encoded video signal;

means for determining from the pair of chrominance error values and the first and second pairs of difference values a luminance correction value for each pixel of the encoded video signal; and means for combining the luminance correction value with the luminance signal to produce the corrected luminance signal.

25. A decoder as recited in claim 24 further comprising means for combining the luminance correction value with the chrominance signal to produce an intermediate corrected chrominance signal for input to the chrominance signal filtering means.

26. A decoder as recited in claim 24 wherein the first and second pair generating means comprises, for at least one dimension, means for calculating as the first pair of difference values for each pixel the difference value between the chrominance value of a current pixel and the chrominance value of each adjacent pixel along said one dimension, and as the second pair of difference values the difference value between the chrominance values of the two adjacent pixels along said one dimension and the difference value between the chrominance value of the current pixel and the mean of the chrominance values of the adjacent pixels along said one dimension, all of the pixels being of the same chrominance component.

27. A decoder as recited in claim 24 wherein the chrominance error values generating means comprises means for calculating for each pixel in each dimension the difference value between the luminance values of a current pixel and each adjacent pixel having the same chrominance component as the current pixel to produce the pair of chrominance error values.

28. A decoder as recited in claim 24 wherein the determining means comprises:

means for producing in each dimension an intermediate luminance correction value from the pair of chrominance error values and the first pair of difference values;

means for clipping the intermediate luminance correction values as a function of the second pairs of difference values to produce a limited luminance correction value in each dimension; and means for producing the luminance correction signal from the limited luminance correction values and the second pairs of difference values.

29. A decoder as recited in claim 28 wherein the intermediate luminance correction value producing means comprises:

means for calculating from the first pair of difference values in each dimension a logic control signal having at least two states; and means for selecting one of the pair of chrominance error values when the logic control signal is in a first state and the other of the pair of chrominance error values when the logic control signal is in a second state as the intermediate luminance correction value.

30. A decoder as recited in claim 29 wherein the intermediate luminance correction value producing means further comprises means for mixing the pair of chrominance error values when the logic control signal is in a third state intermediate the first and second states, the third state having a range of values that determines the degree of mixing between the pair of chrominance error values.

31. A decoder as recited in claim 28 wherein the clipping means comprises:

means for deriving from the second pairs of difference values a clip level in each dimension; and means for applying the clip level to the intermediate luminance correction value to limit the intermediate luminance correction value between zero and the clip level.

32. A decoder as recited in claim 31 wherein the luminance correction signal producing means comprises:

means for deriving from the clip levels a logic control signal having at least two states; and means for selecting one of the limited luminance correction values when the logic control signal is in a first state and another of the limited luminance correction values when the logic control signal is in a second state as the luminance correction signal.

33. A decoder as recited in claim 29 wherein the deriving means comprises:

means for weighting one of the second pair of difference values in each dimension by an amount determined by whether the second pair of difference values represents a peak or an edge to produce a first weighted difference value;

means for combining the one difference values to produce adjusted difference values in each dimension;

means for weighting the other one of the second pair of difference values in each dimension to produce a second weighted difference value; and means for combining the adjusted and second weighted difference values to produce the clip level in each dimension.

34. A decoder as recited in claim 28 wherein the luminance correction signal producing means comprises:

means for calculating from the second pairs of difference values a logic control signal having at least two states; and means for selecting one of the limited luminance correction values when the logic control signal is in a first state and another of the limited luminance correction values when the logic control signal is in a second state as the luminance correction signal.

35. A decoder as recited in claim 34 wherein the calculating means comprises:

means for deriving from the second pairs of difference values a clip level in each dimension; and means for generating from the clip levels the logic control signal.

36. A decoder as recited in claim 34 wherein the luminance correction signal producing means further comprises means for mixing the limited luminance correction values when the logic control signal is in a third state intermediate the first and second states, the third state having a range of values that determines the degree of mixing between the limited luminance correction values.

37. A luminance correction processor for a decoder, the decoder producing from an encoded video signal a luminance signal and a chrominance signal having two components, comprising:
means for generating from the chrominance signal a first pair of difference values and a second pair of difference values in each dimension for each pixel of the encoded video signal, the first and second pairs of difference values being representative of edges and peaks in the chrominance signal;
means for generating from the luminance signal a pair of chrominance error values in each dimension for each pixel of the encoded video signal;
means for determining from the pair of chrominance error values and the first and second pairs of difference values a luminance correction value for each pixel of the encoded video signal; and
means for combining the luminance correction value with the luminance signal to produce a corrected luminance signal.

38. A decoder as recited in claim 37 further comprising means for combining the luminance correction value with the chrominance signal to produce an intermediate corrected chrominance signal for input to the chrominance signal filtering means.

39. A decoder as recited in claim 37 wherein the first and second pair generating means comprises, for at least one dimension, means for calculating as the first pair of difference values for each pixel the difference value between the chrominance value of a current pixel and the chrominance value of each adjacant pixel along said one dimension, and as the second pair of difference values the difference value between the chrominance values of the two adjacent pixels along said one dimension and the difference value between the chrominance value of the current pixel and the mean of the chrominance values of the adjacent pixels along said one dimension, all of the pixels being of the same chrominance component.

40. A decoder as recited in claim 37 wherein the chrominance error values generating means comprises means for calculating for each pixel in each dimension the difference value between the luminance values of a current pixel and each adjacent pixel having the same chrominance component as the current pixel to produce the pair of chrominance error values.

41. A decoder as recited in claim 37 wherein the determining means comprises:
means for producing an intermediate luminance correction value in each dimension from the pair of chrominance error values and the first pair of difference values;
means for clipping the intermediate luminance correction values as a function of the second pairs of difference values to produce a limited luminance correction value in each dimension; and
means for producing the luminance correction signal from the limited luminance correction values and the second pairs of difference values.

42. A decoder as recited in claim 41 wherein the intermediate luminance correction value producing means comprises:
means for calculating from the first pair of difference values in each dimension a logic control signal having at least two states; and
means for selecting one of the pair of chrominance error values when the logic control signal is in a first state and the other of the pair of chrominance error values when the logic control signal is in a second state as the intermediate luminance correction value.

43. A decoder as recited in claim 42 wherein the intermediate luminance correction value producing means further comprises means for mixing the pair of chrominance error values when the logic control signal is in a third state intermediate the first and second states, the third state having a range of values that determines the degree of mixing between the pair of chrominance error values.

44. A decoder as recited in claim 41 wherein the clipping means comprises:
means for deriving from the second pairs of difference values a clip level in each dimension; and
means for applying the clip level to the intermediate luminance correction value to limit the intermediate luminance correction value between zero and the clip level.

45. A decoder as recited in claim 44 wherein the luminance correction signal producing means comprises:
means for deriving from the clip levels a logic control signal having at least two states; and
means for selecting one of the limited luminance correction values when the logic control signal is in a first state and another of the limited luminance correction values when the logic control signal is in a second state as the luminance correction signal.

46. A decoder as recited in claim 44 wherein the deriving means comprises:
means for weighting one of the second pair of difference values in each dimension by an amount determined by whether the second pair of difference values represents a peak or an edge to produce a first weighted difference value;
means for combining the one difference values to produce adjusted difference values in each dimension;
means for weighting the other one of the second pair of difference values in each dimension to produce a second weighted difference value; and
means for combining the adjusted and second weighted difference values to produca the clip level in each dimension.

47. A decoder as recited in claim 41 wherein the luminance correction signal producing means comprises:
means for calculating from the second pairs of difference values a logic control signal having at least two states; and
means for selecting one of the limited luminanee correction values when the logic control signal is in a first state and another of the limited luminance correction values when the logic control signal is in a second state as the luminance correction signal.

48. A decoder as recited in claim 47 wherein the calculating means comprises:

means for deriving from the second pairs of difference values a clip level in each dimension; and means for generating from the clip levels the logic control signal.

49. A decoder as recited in claim 47 wherein the luminance correction signal producing means further comprises means for mixing the limited luminance correction values when the logic control signal is in a third state intermediate the first and second states, the third state having a range of values that determines the degree of mixing between the limited luminance correction values.

50. A chrominance correction processor for a decoder, the decoder producing from an encoded video signal a luminance signal and a chrominance signal having two components, comprising a plurality of processing stages, one for each dimension and each stage having an input signal and an output signal, the stages being connected in series such that the output signal from one stage is the input signal to the next stage and the input signal to the first stage is the chrominance signal and the output signal from the last stage is a corrected chrominance signal.

51. The decoder as recited in claim 50 wherein each stage comprises:

means for generating from the input signal a pair of chrominance correction values for each pixel of the encoded video signal; and means for selecting one of the pair of chrominance correction values for the output signal as a function of the first pair of difference values.

52. A decoder as recited in claim 51 wherein the generating means comprises means for obtaining the difference between a current pixel and each adjacent pixel having the same chrominance component to form the pair of chrominance correction values.

53. A decoder as recited in claim 51 wherein the selecting means comprises:

means for generating from the first pair of difference values a logic control signal having at least two states;

means for providing as the output one of the chrominance correction values when the logic control signal is in one state and the other of the chrominance correction values when the logic control signal is in the other state.

54. A decoder as recited in claim 53 wherein the providing means further comprises means for providing as the output a mix of the chrominance correction values when the logic control signal is in a third state between the at least two states, the third state having a range of values that determines the mix of the chrominance correction values.

55. A decoder as recited in claim 51 wherein the last stage further comprises means for enhancing the chrominance edges of the encoded video signal as a function of the first pair of difference values for the last stage.

56. A decoder as recited in claim 55 wherein the enhancing means comprises:

means for generating a shift control signal as a function of the first pair of difference values for the current pixel and adjacent pixels having the same chrominance component, the shift control signal having at least two states;

means for determining the pixels from which the pair of chrominance correction values is generated by the chrominance correction value generating means for the current pixel; and means for generating the pair of chrominance correction values for the current pixel from the determined pixels.

57. A decoder as recited in claim 56 wherein the determining means comprises;

means for obtaining the pair of chrominance correction values for the current pixel from the current pixel and the two pixels in one direction from the current pixel having the same chrominance component when the shift control signal is in a first state, from the current pixel and the two pixels in the opposite direction from the current pixel having the same chrominance component when the shift control signal is in a second state, and from the current pixel and adjacent pixels having the same chrominance component when the shift control signal is in a third state intermediate the first and second states.

58. A decoder as recited in claim 56 wherein the shift control signal generating means comprises:

means for calculating an edge detect signal from the first pair of difference values for both the current pixel and adjacent pixels;

means for developing the shift control signal in the first state when the edge detect signal for the current pixel has a value less than a first limit value and the edge detect signal for one adjacent pixel has the same sign, in the second state when the edge detect signal for the current pixel has a value more than a second limit value and the edge detect signal for the opposite adjacent pixel has the same sign, and in the third state when the conditions for the first and second states are not satisfied.

* * * * *